United States Patent [19]

Martin et al.

[11] Patent Number: 5,283,442
[45] Date of Patent: Feb. 1, 1994

[54] SURFACE PROFILING USING SCANNING FORCE MICROSCOPY

[75] Inventors: Yves Martin, Ossining, N.Y.; Jordan Poler, Carrboro, N.C.; Hemantha K. Wickramasinghe, Chappaque, N.Y.

[73] Assignee: International Business Machines Corporation, Armonk, N.Y.

[21] Appl. No.: 56,808

[22] Filed: May 3, 1993

Related U.S. Application Data

[63] Continuation of Ser. No. 830,804, Feb. 4, 1992, abandoned.

[51] Int. Cl.⁵ .................................. G01N 21/86
[52] U.S. Cl. ........................ 250/561; 250/307
[58] Field of Search .............. 250/560, 561, 234, 235, 250/236, 306, 307; 324/158 R, 158 P

[56] References Cited

U.S. PATENT DOCUMENTS

| | | | |
|---|---|---|---|
| 4,724,318 | 2/1988 | Binnig | 250/306 |
| 4,902,892 | 2/1990 | Okayama et al. | 250/307 |
| 4,954,704 | 9/1990 | Elings et al. | 250/306 |

OTHER PUBLICATIONS

G. Binnig et al. "Atomic Force Microscope", Physical Review Lett., vol. 56, No. 9, pp. 930-933 (1986).
Y. Martin et al. "Atomic Force Microscope—Force mapping and profiling on a sub 100-Angstrom scale", J. Appl. Phys., vol. 61, No. 10, pp. 4723-4729 (1987).
"Microprobe-Based CD Measurment Tool", IBM TDB, vol. 32, No. 7, p. 168.

*Primary Examiner*—David C. Nelms
*Attorney, Agent, or Firm*—Philip J. Feig

[57] ABSTRACT

A method and apparatus for profiling surfaces, such as sidewalls of a trench or line, using a scanning force microscope provides improved measurement accuracy by controlling the position of the tip responsive to the real-time measured local slope of the surface.

42 Claims, 4 Drawing Sheets

SURFACE PROFILING USING SCANNING FORCE MICROSCOPY

This application is a continuation of application Ser. No. 07/830,804, filed Feb. 4, 1992, now abandoned.

BACKGROUND OF THE INVENTION

The present invention relates to a method and apparatus for profiling surfaces and in particular vertical surfaces in a substrate using scanning force microscopy and specifically to a novel control mechanism for positioning a tip of a scanning force microscope for sensing and tracking the sidewall of a trench or line disposed in a substrate. Quite specifically, the instantaneous slope of the surface to be profiled is measured and used for controlling the scan track of the scanning force microscope tip.

The capability to measure line widths and to profile trenches in substrates is becoming more and more important in the field of micro-metrology. Presently, instruments based upon optical interaction are inaccurate or have physical limitations when the features to be measured are smaller than a micrometer.

Accurate micro-metrology is typically performed with scanning electron microscopes (SEM). There are several disadvantages to the use of a SEM, such as the need to perform measurements in a vacuum environment and cross-sectioning of the substrate where the measurements are performed at only one location of the groove or trench. SEM measurement is a time consuming process and there is limited spatial accuracy due to effects resulting from e-beam interaction with the material being measured.

The use of scanning tunneling microscopes to measure forces between a tip and a surface of an insulating material by simply mounting a scanning tunneling microscope tip on a cantilever beam is described in the article by G. Binnig et al entitled "Atomic Force Microscope", Physical Review Letters, Vol. 56, No. 9, pp. 930–933 (1986). The resultant instrument combines the principles of the scanning tunneling microscope and the stylus profilometer.

Subsequently, in an article by Y. Martin et al entitled "Atomic Force Microscope-Force Mapping and Profiling on a sub 100 Å Scale", J. Appl. Phys., Vol. 61, No. 10, pp. 4723–4729 (1987) a modified atomic force microscope was described which enabled a precise measurement of the force between a tip and a sample over a tip sample distance in the range between approximately 30–50 angstroms. In a first application, the force signal was used to maintain constant tip-surface spacing for facilitating profiling with a spatial resolution of 50 angstroms. In a second application simultaneous measurement of force and surface profile was described.

A publication entitled "Microprobe-Based CD Measurement Tool", IBM Technical Disclosure Bulletin" Vol. 32, No. 7, p. 168 (December 1989) describes the use of an atomic force microscope designed for measuring trench depth and width. The system incorporates a two-dimensional laser heterodyne system which detects the change in resonance frequency of the vibrating probe tip as the tip approaches the surface. The probe tip may be vibrated in either the horizontal or vertical direction depending upon which surface is being approached. The probe tip is held stationary while the wafer or other part being measured is moved parallel or perpendicular to its surface and the displacement measured. The instrument design utilizes a three-point probe tip with well defined sensor points for detecting bottom, right and left edges of a trench. The tip is lowered into the trench and is then repeatedly moved left to right at a series of specific heights above the bottom of the trench. The trench width is thereby measured as a function of height and, thus, accurate measurements of trench dimensions can be made.

In the prior art techniques, the top edges of the trench are detected by first vertically moving the tip toward the top surface of the trench and then scanning the tip horizontally within the trench. The trench measurements are then performed by lowering the tip in the center of the trench. The tip is made to horizontally approach one of the sidewalls and then the other in order to measure the width at a specific depth location. The depth of the tip in the trench is changed and the two sidewall approach technique is repeated. At each depth location, two measurements are performed, as the tip approaches the first and then the second sidewall, which is time consuming. Moreover, a complex dual optical sensor is required for first performing the vertical and then the horizontal approaches.

In prior apparatus, the tip is vibrated in the horizontal direction as well as the conventional vertical direction, possibly at different frequencies, in order to sense the horizontal and vertical components of the force gradient. A serious limitation of such an arrangement is the need to measure the horizontal vibration. However, by using a second interferometer with its light beam focused on the side of the cantilever supporting the tip, the horizontal vibration be measured. Such an arrangement significantly increases the complexity of the apparatus.

SUMMARY OF THE INVENTION

The present method overcomes these limitations by requiring only a single approach to the surface to be measured. Thereafter, the tip motion is controlled in situ responsive to the measurement of the local surface, line or sidewall slope. The direction of the next measurement location or step and the feedback adjusting direction for the tip is automatically determined from the measured local slope. Moreover, the tip is vibrated in the depth (or Z-axis) direction permitting use of a conventional optical measurement system.

Conventional non-contact scanning force microscopy relies upon unidirectional sensing. That is, vertical force gradients are sensed and used for deriving a feedback signal for vertically positioning the tip. In accordance with the present invention, a single feedback signal is generated for positioning the tip. A vertical surface, such as a sidewall, is sensed by detecting the damping of the vertical vibratory motion as the tip approaches a sidewall, thereby eliminating the need to measure the tip vibration in the horizontal direction for sensing the sidewall.

A primary advantage of the present invention is the ability to use existing scanning force microscopes for sensing the sidewall surface. The tip scan track is controlled by in-situ measurement of the local slope which measurement is then used for determining the new scan position and the new feedback adjusting direction.

An important aspect of the invention is the choice of the tip shape to enable accurate sensing of the bottom corner of a trench or line and sensing of an area under an overcut of a trench. A scanning force microscope is useful as an instrument for micro-metrology. However, conventional tapered or cylindrical tips, for example, cannot profile an undercut. A three pointed tip is capable of sensing horizontal and vertical surfaces, but fails to sense corners. A "boot" shaped tip is preferred for profiling trenches. The tip geometry is designed so that the radius of curvature of the tip is less than the smallest radius of curvature of the surface to be measured. The tip is preferably fabricated by wet etching where the process is stopped before the shape becomes that of a sharp pyramidal tip. Tips of various shape and methods of fabricating such tips are described in European Patent Application Serial No. 89115097 assigned to the same assignee as the present application.

According to known tracking systems, the tip scans the workpiece along an axis in a scanning direction (X) and a feedback system adjusts the tip-workpiece spacing along an axis in a feedback direction (Z) normal to the scanning direction.

In accordance with the teachings of the present invention, the tip to surface feedback adjusting direction is controlled in two dimensions, both in the X-axis and Z-axis directions so that the tip always moves nominally normal to the local surface being scanned. The tip feedback adjusting direction is typically in the range between 90±45 degrees, where 90 degrees corresponds to a direction normal to the top surface of the workpiece or substrate to be profiled. The scanning direction is adjusted to follow the local slope of the surface to be profiled in order to minimize the feedback signal.

A primary object of the present invention is therefore, the provision of a method and apparatus for profiling a near vertical surface using a scanning force microscope.

Another object of the present invention is the provision of a method and apparatus for profiling a near vertical surface using a scanning force microscope by positioning or scanning the tip in proximity to the surface responsive to the measured local slope of the surface.

A further object of the present invention is the provision of a method and apparatus for profiling a near vertical surface using a scanning force microscope by providing two dimensional dither motion to the tip.

Further and still other objects of the invention will become more clearly apparent when the following description is read in conjunction with the accompanying drawing.

DETAILED DESCRIPTION

Scanning force microscopes are described in U.S. Pat. No. 4,724,318 issued to G. Binnig and assigned to the same assignee as the present application which patent is incorporated herein by reference.

According to the teachings of the Binnig patent, a tip is brought so close to the surface of a sample to be investigated that the forces occurring between the atoms at the apex of the tip and those at the surface cause a spring-like cantilever to deflect. The deflection of the cantilever provides a variation of the tunnel current, and that variation is used to generate a correction signal which can be employed to control the distance between the tip and the surface of the sample, in order, for example, to maintain the force between them constant as the tip is scanned across the surface of the sample by means of an xyz-drive. In certain modes of operation, the cantilever may be excited to oscillate in the z-direction. If the oscillation is at the resonance frequency of the cantilever, the resolution is enhanced.

The article by Y. Martin et al, supra, describes surface profiling and atomic force microscopy with optical sensing of tip position, which article is incorporated herein by reference.

Figure 1:
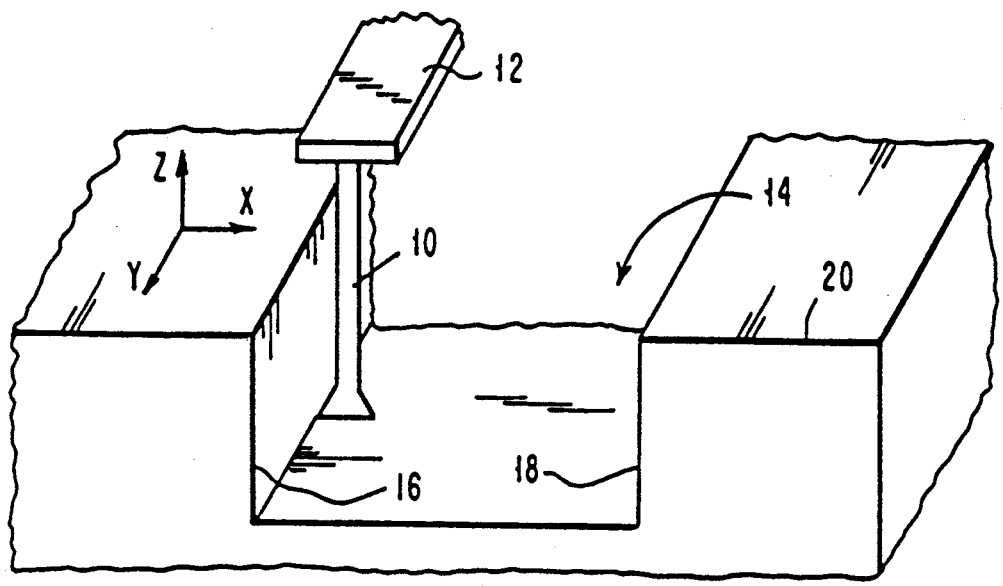
FIG. 1 is a representation of a tip of a scanning force microscope disposed within a trench located in a substrate.

Referring now to the figures and to FIG. 1 in particular, there is shown a representation (not drawn to scale), of a tip 10 coupled to a cantilever 12 of a scanning force microscope which tip is disposed within a trench 14 located in a substrate 20, the sidewalls 16 and 18 of which are to be profiled. A conventionally shaped tip is inadequate for profiling a structure having a near vertical wall, particularly when the height of the trench is greater than approximately 100 Å. It has been determined that improved results are obtained when the tip 10 is in the shape of boot as shown generally in FIG. 1. Tips of a boot shape are fabricated using several lithographic steps in a combination of dry and wet etching processes. The process is stopped before the tip is formed into a sharp pyramidal tip. Tips of various shapes and fabrication techniques are described in European Patent Application Ser. No. 89115097 which corresponds to U.S. Ser. No. 07/568,451 filed Aug. 16, 1990 and which is incorporated herein by reference.

Figure 2:
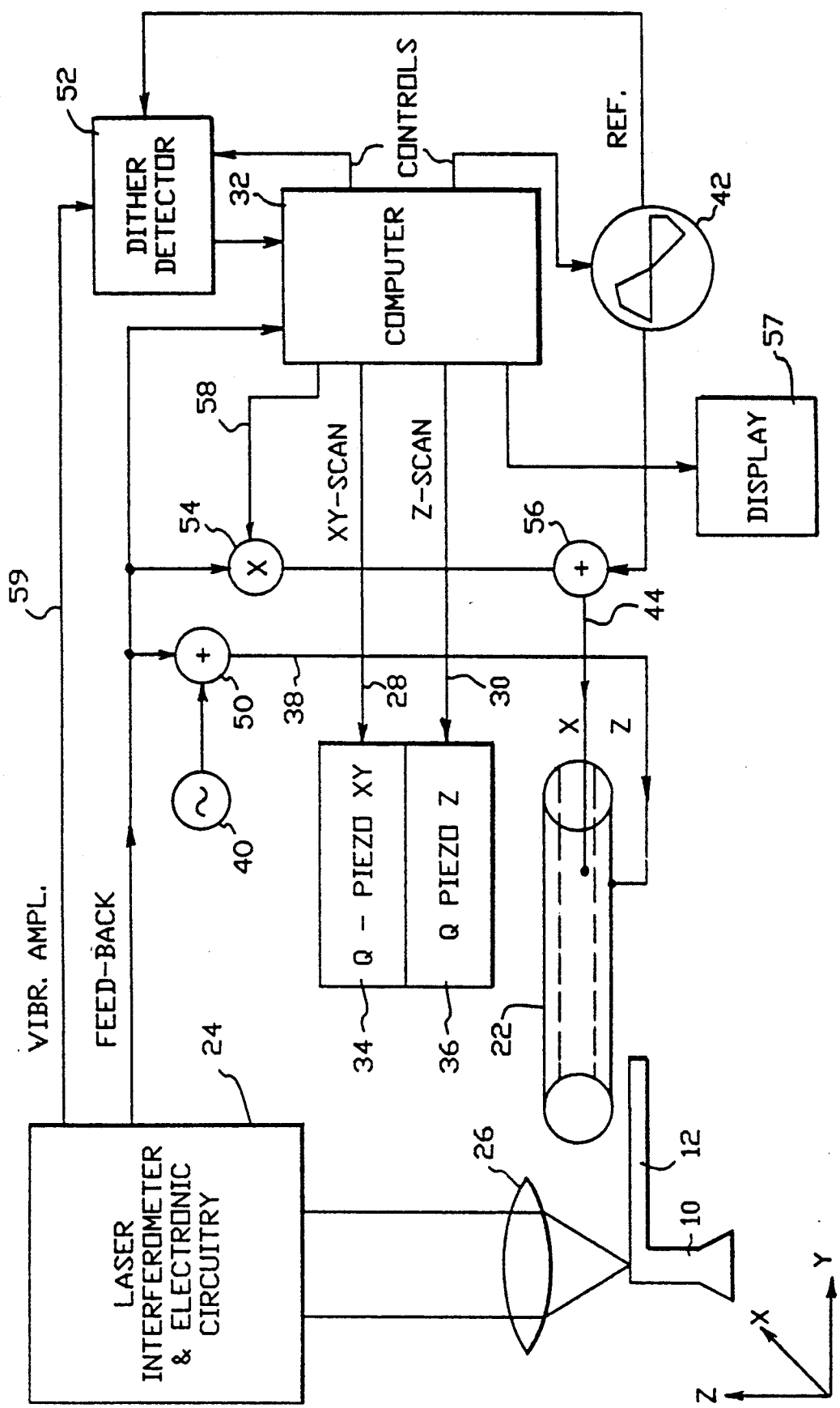
FIG. 2 is a schematic block diagram of a preferred embodiment of a scanning force microscope useful for practicing the present invention.

FIG. 2 is a schematic block diagram of a preferred embodiment of an arrangement for controlling the tip position of a scanning force microscope for profiling near vertical structures such as a sidewall of a trench or line in a substrate.

As used herein, the Z-axis direction shall be understood to refer to a direction parallel to the longitudinal axis of the tip 10. The X-axis direction shall be understood to refer to a direction normal to the longitudinal axis of the tip 10.

Cantilever 12 with tip 10 is coupled to a fast X-Z piezoelectric tube scanner 22 for rapidly and accurately controlling the position of tip 10 in both the X-axis direction and the Z-axis direction. Preferably, vibratory motion of tip 10 is measured by laser interferometer and electronic circuitry 24 which causes a laser beam to be transmitted through collimating lens 26 onto the back of the cantilever 12 and receives the beam reflected from the cantilever 12 which reflected beam travels back through lens 26 to a detector in laser interferometer and electronics circuitry 24. Details of a preferred laser interferometer and electronics circuitry are described, for example, in the article by Martin et al, supra. The laser interferometer and electronic circuitry 24 accurately detects the vibratory motion of cantilever 12 and hence of tip 10 and provides output signals commensurate with the motion of the tip 10 for controlling the scan track of the tip 10 as will be described hereinafter.

The position of the tip 10 is scanned in the XY-plane and in the Z-axis direction, where the XY-plane is a plane parallel to the top surface of the substrate 20 and where the Z-axis is in the depth or vertical direction (as shown) of the trench or line, responsive to scan signals provided along respective conductors 28 and 30 from computer 32 to Q-piezoelectrics 34 for X-axis and Y-axis displacements (xy-plane displacement) and Q-piezoelectric 36 for Z-axis displacement.

In addition to the scan motion provided in response to scan signals from computer 32 along conductors 28 and 30, the tip 10 is vibrated in the Z-axis direction at a high frequency, typically at the resonance frequency of the cantilever/tip combination, preferably at an amplitude of approximately 10 Å at a frequency of 300 kHz, by virtue of a signal from a high frequency oscillator 40 provided along conductor 38 to piezoelectric tube scanner 22.

The tip 10 is also made to undergo dither motion about its nominal position in the X-axis direction (the trench width direction) at a lower frequency than the Z-axis direction dither. The X-axis direction dither is preferably at an amplitude of approximately 10 Å at a frequency of 3 kHz. The X-axis direction dither motion is provided by virtue of a signal from oscillator 42 along conductor 44 to the piezoelectric tube scanner 22.

The tip is coupled to a X-Z piezoelectric tube scanner 22 for faster position control. However, the scanner provides only a relatively limited range of motion, approximately one micron. Therefore, the scanner itself is coupled to a long range, but slower responding, scanner (not shown). The long range scanner is controlled by Q-piezoelectrics 34 and Q-piezoelectric 36. The tube scanner 22 is controlled by the signals provided along conductors 38 and 44.

Having described the "open loop" scanning the and superimposed dither motion of the tip 10, the manner of providing feedback for controlling the tracking of the tip for improved profiling of structures and vertical structures in particular, will now be described.

Figure 3:
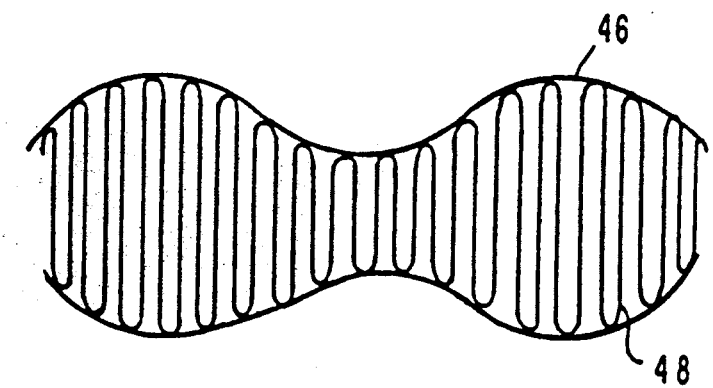
FIG. 3 is a graphical representation of the tip vibration along the Z-axis as detected by a laser interferometer.

FIG. 3 is a graphical illustration of the signal derived from the detected laser beam reflected from cantilever 12. The signal envelope 46 corresponds to the X-axis direction dither motion and the high frequency signal 48 corresponds to the Z-axis direction dither motion. The signals are individually demodulated by signal processing means well-known in the art. The average amplitude of the high frequency signal is obtained in the laser interferometer and electronic circuitry 24. The amplitude is indicative of the spacing between the tip and surface to be profiled. In an atomic force microscope as the vibrating tip approaches a surface to be profiled, the force gradient between the tip and surface increases, thereby decreasing the amplitude of the vibratory motion of the tip. This principle of atomic force microscopy is used to determine the spacing between the tip and surface as a function of the detected signal.

The signal corresponding to the high frequency or Z-axis signal is provided to summer 50. The summer 50 combines the signal from oscillator 40 with the feedback signal to adjust the amplitude of the Z-axis direction dither of the tip 10.

A second output 59 from laser interferometer and electronic circuitry 24 provides the signal envelope 46 to a dither detector 52 which preferably is a lock-in detector. Another input to dither detector 52 is a reference signal from x-axis direction oscillator 42.

The output of the dither detector 52 is the signal magnitude of the envelope 46, which is indicative of the slope of the surface, as will be described below. The output signal of the dither detector is provided to computer 32. Another input to computer 32 is the feedback signal from laser interferometer and electronic circuitry 24. The computer, in turn, calculates and provides an X feedback direction signal to a multiplier 54 which adjusts the proportion of the X-axis to the Z-axis feedback motion. The other input to multiplier 54 is the Z-axis direction feedback signal from laser interferometer and electronic circuitry 24.

The output signal from multiplier 54 is provided to a summer 56 where the output signal is combined with the signal from X-axis direction oscillator 42.

As will be described in greater detail below, the piezoelectric tube scanner 22 controls the tip motion in the Z-axis direction responsive to the feedback signal from laser interferometer and electronic circuitry 24 in a conventional manner. The X-axis direction position is controlled responsive to the feedback signal from laser interferometer and electronic circuitry 24 as modified by the slope dependent signal provided from computer 32 to multiplier 54 along conductor 58.

The computer 32 provides the additional function of maintaining the X, Y and Z position of the tip which can be determined from the voltages applied to the Q-piezoelectrics 34, 36 or from independent position sensors in order to provide a two-dimensional or three-dimensional representation of the sidewall surface being profiled as a function of position of the tip in space. The data can be stored and/or provided in tabular form or be converted to an image.

The use of the slope responsive signal obviates the heretofore required optical detection of the cantilever vibratory motion using two orthogonally disposed laser interferometers and associated circuitry.

Having described a preferred embodiment of the apparatus useful for practicing the invention, the method of controlling the tip tracking will now be described.

The dither signals applied to piezoelectric tube scanner 22 and hence tip 10 results in the tip undergoing vibratory motion along the Z-axis direction according to the waveform of the type shown in FIG. 3. The amplitude of the envelope 46 and the phase of the envelope relative to the phase of the signal from oscillator 42 is a function of the direction of the tip vibratory motion with respect to an axis normal to the substrate or workpiece surface. That is, the amplitude increases when the dither is in a direction normal to the surface and decreases to zero when the dither direction is parallel to the surface. The phase indicates the sense of the slope relative to the normal axis. It is therefore possible to extract information regarding the slope of the surface being profiled from the envelope 46 of the vibration signal. The slope information is used to control the feedback direction of the atomic force microscope and also to control the scan direction of the tip. The Y-axis direction, parallel to the longitudinal axis of the trench or line, is scanned in incremental steps responsive to signals provided from computer 32 to Q-piezoelectric 34. Y-axis direction movement permits profiling at different cross-sections of the trench or line to be profiled.

Figure 4A:
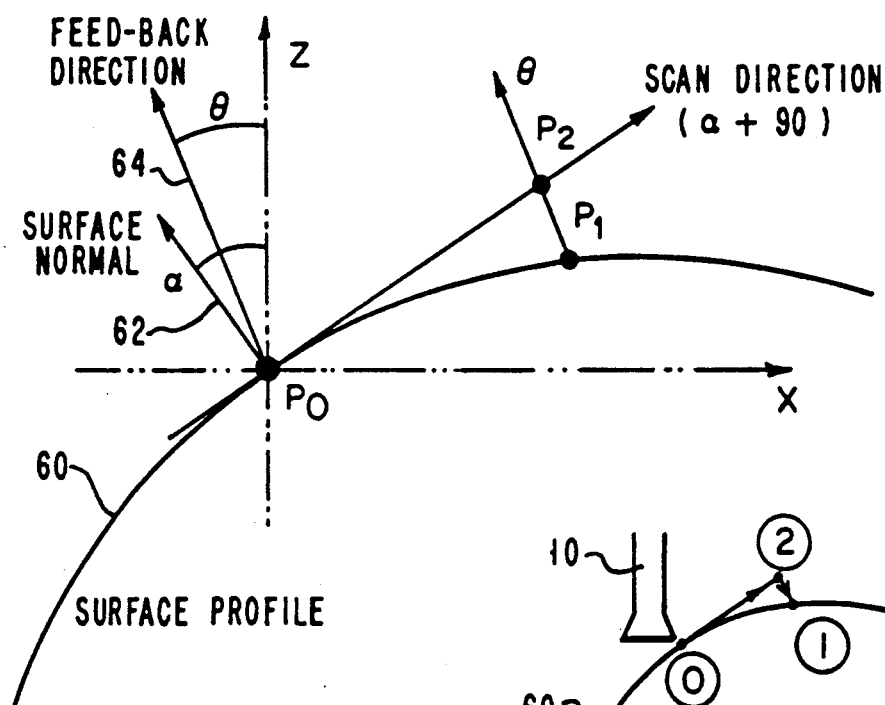
FIGS. 4A and 4B are representations of a method of scanning a surface.
Figure 4B:
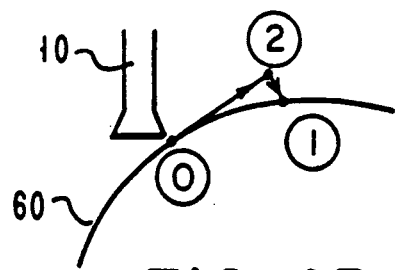

Referring now to FIG. 4A and insert FIG. 4B, when tip 10 is disposed in proximity to surface 60 at point P0, the surface normal is indicated as arrow 62 disposed at an angle $\alpha$ with respect to the Z-axis of the coordinate system as shown. The feedback direction along arrow 64 is offset at an angle $\theta$ with respect to the Z-axis of the coordinate system as shown by virtue of the signal provided from multiplier 54 as will be explained below. The offset is provided to reduce the likelihood of contact between the tip 10 and surface 60 especially at the corners of a trench when the next measurement point is recorded. It will be understood by those skilled in the art that the tip 10 is typically spaced only 20 Å to 50 Å from the surface to be profiled.

The slope dependent signal from computer 32 to multiplier 54 along conductor 58 modifies the feedback signal provided to the X-axis direction of the piezoelectric tube scanner 22 and hence tip 10. The effect is to vary the ratio of the feedback signals to the X-axis and Z-axis of the scanner 22 so that the tip 10 follows the feedback direction arrow 64. The computer 32 provides a signal to Q-piezoelectric 34 for controlling scanning of the tip in the X-axis direction and provides another signal to Q-piezoelectric 36 for controlling scanning of the tip in the Z-axis direction in order that the tip scans in a direction along an axis disposed at an angle of 90 degrees from the surface normal (arrow 62) in the direction of the measured slope from point P0 to the point P2 rather than to the point P1 located on the surface 60.

The tracking process occurs in two steps. First, the analog electronic feedback system described adjusts the tip position from point P2 to point P1 using the fast piezoelectric tube scanner 22. The computer 32 records the change in the feedback signal as the tip tracks from point P2 to point P1, and calculates the new position of the tip. Second, the computer provides signals to Q-piezoelectric 34 and Q-piezoelectric 36 to move the tip from point P2 to point P1 so that the scanner 22 returns to its original position for subsequent movement. The system then repeats the process and measures the new slope at the point P1, adjusts the signal along conductor 58 accordingly, and causes the tip to track to the next position following the new scan direction.

Another advantage of the present invention is the capability of scanning the surface of a substrate until a non-planar surface, such as a trench or line is encountered. This ability results from the fact that the modulated feedback signal is zero so long as the surface is parallel to the direction of the tip dither and then when a non-planar or vertical structure in the surface is encountered by the tip, the dither direction is no longer normal to the surface and the amplitude of the signal modulation increases.

In practice, the tip traverses the surface of a substrate or other workpiece while undergoing dither motion in a direction parallel to the surface. Upon encountering a trench or a line, the dither motion will be in a direction which is not parallel with the surface. At that instant in time the amplitude of the modulation signal will have a magnitude and be indicative of the downward slope of the trench or the upward slope of the line. The tip motion will track the surface responsive to the measured slope. Assuming a rectangular feature, there will be a time when the X-axis direction dither motion is again parallel to the surface, e.g. at the bottom of a trench or at the top of a line. Thereafter, the X-axis direction dither motion will not be parallel to the surface and the modulation signal amplitude will indicate a slope. The tip motion will track the surface responsive to the measured slope. Upon the tip approaching the top surface of the workpiece, the X-axis direction dither motion will again be parallel to the surface.

Experimental tests were conducted using a substrate having raised photoresist lines approximately 1 $\mu$m high and 0.5 $\mu$m high and 2.5 $\mu$m wide. The large dimensions used in the experiment resulted from the relatively large size (4.8 $\mu$m) boot shaped tip used. Using smaller boot shaped tips will allow profiling of trenches or lines having a width of 0.5 $\mu$m or smaller.

Figure 5A:
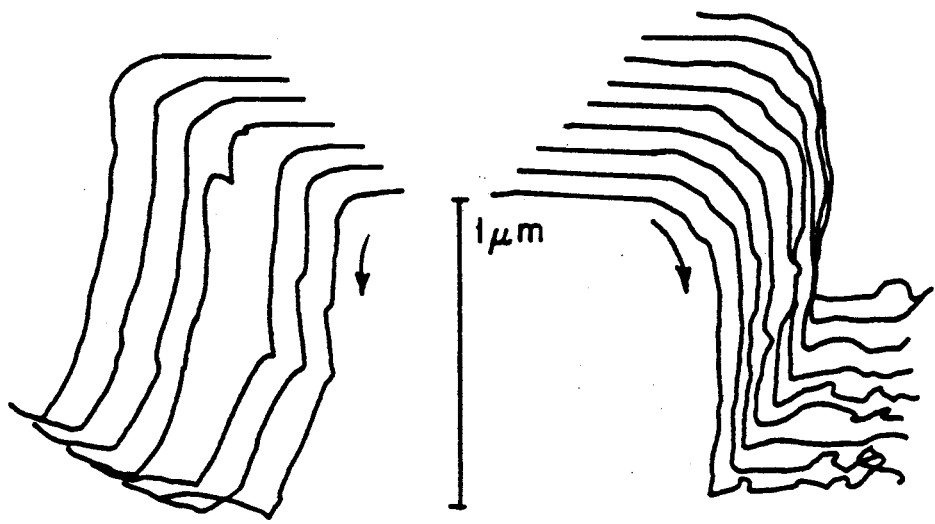
FIGS. 5A and 5B are graphical representations of experimental data obtained when practicing the present invention.

FIG. 5A is a graphical representation of the profile data of several scans obtained over the two sidewalls of the 1 $\mu$m high line, performed in two independent measurements because of the limited range of the piezoelectric tube scanner available. The walls were substantially vertical and features as small as 100 Å are visible along the side walls.

Figure 5B:
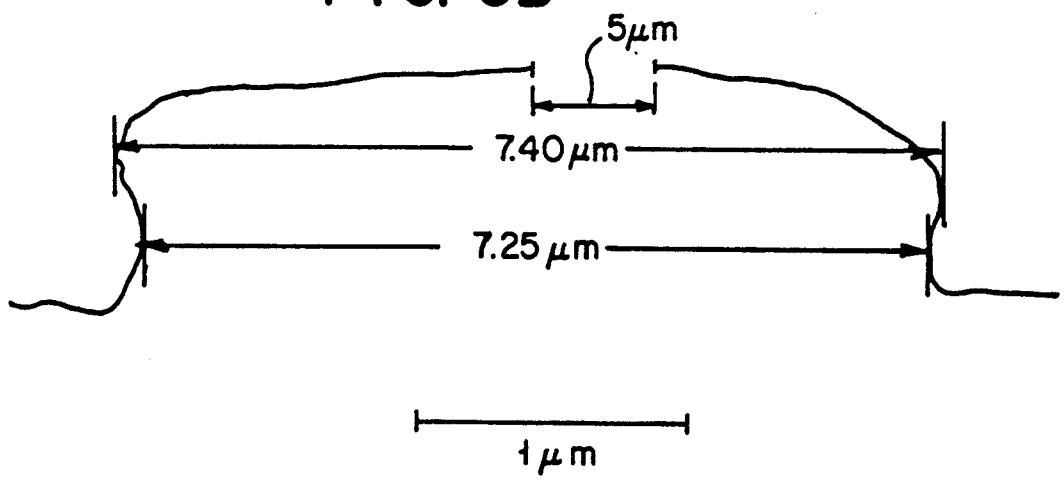

FIG. 5B shows the line profile measured in a quasi continuous scan. Visible in the figure are the undercuts in both sidewalls. The motion was stopped in the middle of the scan to allow for a 5 $\mu$m motion of the scanner. The complete profile illustrates the accurate measurement of line widths, at different heights, even in the presence of undercuts. Based upon the measurements shown and knowing that the width of the tip is 4.8 $\mu$m it was possible to calculate that the line width at the tip of the line is 2.60 $\mu$m and is 2.45 $\mu$m at the narrowest portion.

The measurement accuracy is in the order of several hundred Angstroms. The accuracy is limited primarily by the poor quality of the scanners used. The non-linearity due to the piezoelectric hysteresis is typically five percent of the trench width. With currently available scanning type microscope workstations, which include independent sensors, the accuracy of these measurements should reach 1 nanometer or better.

While the cantilever/tip motion is described in conjunction with a laser interferometry it will be apparent to those skilled in the art that other cantilever position detection schemes, such as capacitance systems, can be used.

While the above description and FIG. 3 in particular refers to the dither signals from oscillators 40 and 42 as being sinousoidal, it will be apparent to those skilled in the art that other waveforms, such as triangular, rectangular pulses, and the like can also be used.

It will also be apparent to those skilled in the art that the feedback, or alternatively a signal from computer 32 may be provided to a display 57 in a conventional manner in order to provide a visual image of the feedback signal to seek maxima or minimum signals or to provide a visual image of the trench or line itself.

While there has been described and illustrated a preferred embodiment and method of profiling sidewalls using scanner force microscopy, it will be apparent to those skilled in the art that modifications and variations are possible without deviating from the broad scope of the present invention which should be limited solely by the scope of the appended claims.

What is claimed is:

1. A method of controlling the position of a tip of a scanning force microscope for profiling a surface of a feature located in a workpiece comprising the steps of:
   sensing the distance of the surface relative to the tip;
   determining a local slope of the surface; and
   controlling the position of the tip responsive to said determining the local slope of the surface for causing the tip to follow the profile of the surface.

2. A method of controlling the position of a tip of a scanning force microscope for profiling a surface of a feature located in a workpiece comprising the steps of:

applying a first dither motion at a first frequency to the tip in a direction substantially parallel to the longitudinal axis of the tip, applying a second dither motion at a second frequency to the tip in a direction substantially normal to the longitudinal axis of the tip;

detecting the motion of the tip for sensing the distance of the surface relative to the tip and for determining a local slope of the surface, and controlling the position of the tip responsive to said determining the local slope of the surface for causing the tip to follow the profile of the surface.

3. A method of controlling the position of a tip of a scanning force microscope as set forth in claim 2, where said detecting the motion of the tip provides a modulated signal indicative of the motion of the tip, said sensing the distance being commensurate with the amplitude of the modulated signal and said determining a local slope being commensurate with an envelope of the modulated signal.

4. A method of controlling the position of a tip of a scanning force microscope as set forth in claim 3, wherein said first frequency is greater than said second frequency.

5. A method of controlling the position of a tip of a scanning force microscope as set forth in claim 2, where said detecting the motion of the tip comprises reflecting an energy beam from a cantilever supporting the tip for obtaining a signal indication of the motion of the tip in a direction substantially parallel to the longitudinal axis of the tip.

6. An apparatus for controlling the position of a tip of a scanning force microscope for profiling a surface of a feature located in a workpiece comprising:

means for applying a first dither motion at a first frequency to the tip in a direction substantially parallel to the longitudinal axis of the tip;

means for applying a second dither motion at a second frequency to the tip in a direction substantially normal to the longitudinal axis of the tip;

means for sensing the motion of the tip;

means for determining the local slope of the surface responsive to the sensed motion of the tip; and means for controlling the position of the tip responsive to the determined local slope for causing the tip to follow the surface.

7. An apparatus for controlling the position of a tip of a scanning force microscope as set forth in claim 6, wherein said first frequency is greater than said second frequency.

8. An apparatus for controlling the position of a tip of a scanning force microscope as set forth in claim 7, wherein said means for sensing comprises means for reflecting an energy beam from a cantilever supporting said tip for obtaining a modulated signal indicative of the motion of the tip.

9. An apparatus for controlling the position of a tip of a scanning force microscope as set forth in claim 8, wherein said means for determining the local slope measures the envelope of said modulated signal which envelope is commensurate with the local slope of the surface.

10. An apparatus for controlling the position of a tip of a scanning force microscope as set forth in claim 9, wherein said means for sensing measures the amplitude of said modulated signal which amplitude is commensurate with the distance between said tip and the surface.

11. An apparatus for controlling the position of a tip of a scanning force microscope as set forth in claim 8, wherein said means for controlling the position of the tip comprises scanning means coupled to the tip for positioning the tip responsive to the envelope of said modulated signal and the amplitude of said modulated signal.

12. An apparatus for controlling the position of a tip of a scanning force microscope as set forth in claim 11, wherein said scanning means comprises a first small amplitude scanner coupled to a slow large amplitude scanner.

13. An apparatus for controlling the position of a tip of scanning force microscope as set forth in claim 12, wherein said tip is boot shaped.

14. An apparatus for controlling the position of a tip of a scanning force microscope as set forth in claim 6, further comprising display means coupled to said means for sensing and said means for controlling for displaying the profile of the surface.

15. An apparatus for controlling the position of a tip of a scanning force microscope as set forth in claim 6, wherein said means for controlling the position comprises a piezoelectric scanner coupled to a cantilever supporting said tip.

16. An apparatus for controlling the position of a tip of a scanning force microscope as set forth in claim 6, wherein said tip is boot shaped.

17. A method of profiling a surface of a feature located in a workpiece by controlling positioning of a tip of a scanning force microscope comprising the steps of:

disposing the tip coupled to a cantilever in proximity to a feature;

scanning the tip along an axis in a direction substantially parallel to the longitudinal axis of the tip;

scanning the tip along an axis in a direction substantially normal to the longitudinal axis of the tip;

applying a first dither motion to the tip at a first frequency in a direction along an axis substantially parallel to the longitudinal axis of the tip;

applying a second dither motion to the tip at a second frequency in a direction along an axis substantially normal to the longitudinal axis of the tip;

sensing the motion of the tip and providing a feedback signal and a local slope signal in response to the motion of the tip;

controlling the scanning of the tip along an axis in the direction substantially parallel to the longitudinal axis of the tip responsive to said feedback signal; and controlling the position of the tip in the direction substantially normal to the longitudinal axis of the tip responsive to said local slope signal and to said feedback signal for causing the tip to follow the profile of the surface of the feature.

18. A method of profiling a surface of a feature as set forth in claim 17, further comprising display means for displaying the profile of surface.

19. A method of profiling a surface of a feature as set forth in claim 17, wherein said first frequency is greater than said second frequency.

20. A method of profiling a surface of a feature as set forth in claim 19, wherein said sensing the motion of the tip comprises reflecting an energy beam from said cantilever and obtaining a modulated signal commensurate with the motion of the tip.

21. A method of profiling a surface of a feature as set forth in claim 20, wherein said providing a feedback signal includes measuring the amplitude of the modulated signal and said providing a local slope signal includes measuring the envelope of the modulated signal.

22. An apparatus for profiling a surface of a feature located in a workpiece by controlling positioning of a tip of a scanning force microscope comprising:
- a tip having a longitudinal axis coupled to a cantilever;
- first scan means coupled to said tip for causing said tip to undergo scanning motion along an axis in a direction substantially parallel to said longitudinal axis of said tip;
- second scan means coupled to said tip for causing said tip to undergo scanning motion along an axis in a direction substantially normal to said longitudinal axis of said tip;
- scanner means coupled to said tip;
- first dither means coupled to said scanner means for causing said tip to undergo a first dither motion at a first frequency in a direction substantially parallel to said longitudinal axis of said tip;
- second dither means coupled to said scanner means for causing said tip to undergo a second dither motion at a second frequency in a direction substantially normal to said longitudinal axis of said tip;
- sensing means disposed for sensing motion of said tip and providing both a feedback signal and a local slope signal indicative of the sensed motion;
- means coupled to said scanner means and to said sensing means for controlling the position of said tip along an axis in a direction substantially parallel to said longitudinal axis of said tip responsive to said feedback signal;
- slope determining means coupled to said sensing means for determining the local slope of a surface in proximity to said tip responsive to said local slope signal and providing a surface slope signal; and
- means coupled to said scanner means and said slope determining means for controlling the position of said tip responsive to said surface slope signal.

23. An apparatus for profiling a surface of a feature as set forth in claim 22, wherein said tip is boot shaped.

24. An apparatus for profiling a surface of a feature as set forth in claim 22, further comprising display means for displaying the profile of the surface.

25. An apparatus for profiling a surface of a feature as set forth in claim 22, wherein said scanner means comprises a fast small amplitude scanner.

26. An apparatus for profiling a surface of a feature as set forth in claim 25, wherein said scanner means further comprises a slow large amplitude scanner coupled to said fast small amplitude scanner.

27. An apparatus for profiling a surface of a feature as set forth in claim 22, wherein said first frequency is greater than said second frequency.

28. An apparatus for profiling a surface of a feature as set forth in claim 27, wherein said sensing means comprises means for reflecting an energy beam from said cantilever for obtaining a modulated signal indicative of the motion of said tip.

29. An apparatus for profiling a surface of a feature as set forth in claim 28, wherein said feedback signal is commensurate with the amplitude of said modulated signal and said local slope signal is commensurate with the envelope of said modulated signal.

30. An apparatus for profiling a surface of a feature as set forth in claim 29, wherein said tip is boot shaped.

31. An apparatus for controlling the position of a tip of a force microscope for profiling a surface of a feature located in a workpiece, comprising:
- means for sensing the distance of said tip relative to said surface,
- means for determining the local slope of said surface, and
- means responsive to said local slope for controlling the position of said tip for causing said tip to follow the profile of said surface.

32. An apparatus for controlling the position of a tip of a force microscope as set forth in claim 31, wherein said tip is supported by a deflectable cantilever and said means for sensing includes means for sensing the deflection of said cantilever.

33. An apparatus for controlling the position of a tip of a force microscope as set forth in claim 31, further including display means for displaying the profile of said surface.

34. An apparatus for controlling the position of a tip of a force microscope as set forth in claim 31, where said means for determining the local slope of said surface includes means for applying a first dither motion to said tip in a direction substantially normal to a longitudinal axis of said tip and means for applying a second dither motion to said tip in a direction substantially parallel to a longitudinal axis of said tip.

35. A method for determining the profile of a feature of a surface using a force microscope tip which is scanned along said surface, comprising the steps of:
- determining the instantaneous slope of the surface to be profiled by said tip, and
- controlling the scanning of said tip in accordance with said instantaneous slope to cause said tip to follow the profiled said surface.

36. A method for determining the profile of a feature of a surface using a force microscope tip as set forth in claim 35, further comprising supporting said tip by a deflectable cantilever and said determining the instantaneous slope including sensing the deflection of said cantilever.

37. A method for determining the profile of a feature of a surface using a force microscope tip as set forth in claim 35, further comprising displaying the profile of said surface.

38. A method for determining the profile of a feature of a surface using a force microscope tip as set forth in claim 35, further comprising applying a first dither motion to said tip in a direction substantially parallel to the longitudinal axis of the tip and applying a second dither motion to said tip in a direction substantially normal to the longitudinal axis of the tip.

39. An apparatus for profiling a feature of a surface using a force microscope tip which is scanned along said surface, comprising:
- means for determining the local slope of the feature to be profiled by said tip, and
- means for controlling the scanning of said tip in accordance with said local slope to cause said tip to follow the profile of said feature.

40. An apparatus for profiling a feature of a surface using a force microscope tip as set forth in claim 39, wherein said tip is supported by a deflectable cantilever and said means for determining the local scope of the feature includes means for sensing the deflection of said cantilever.

41. An apparatus for profiling a feature of a surface using a force microscope tip as set forth in claim 39, further comprising display means for displaying the profile of the feature.

42. An apparatus for profiling a feature of a surface using a force microscope tip as set forth in claim 39, wherein said means for determining the local slope of the feature includes means for applying a first dither motion to said tip in a direction substantially parallel to a longitudinal axis of said tip and means for applying a second dither motion to said tip in a direction substantially normal to a longitudinal axis of said tip.

* * * * *